Nov. 19, 1935. W. G. WOLFE 2,021,533
TELLTALE SYSTEM FOR PROJECTION APPARATUS
Filed June 29, 1933
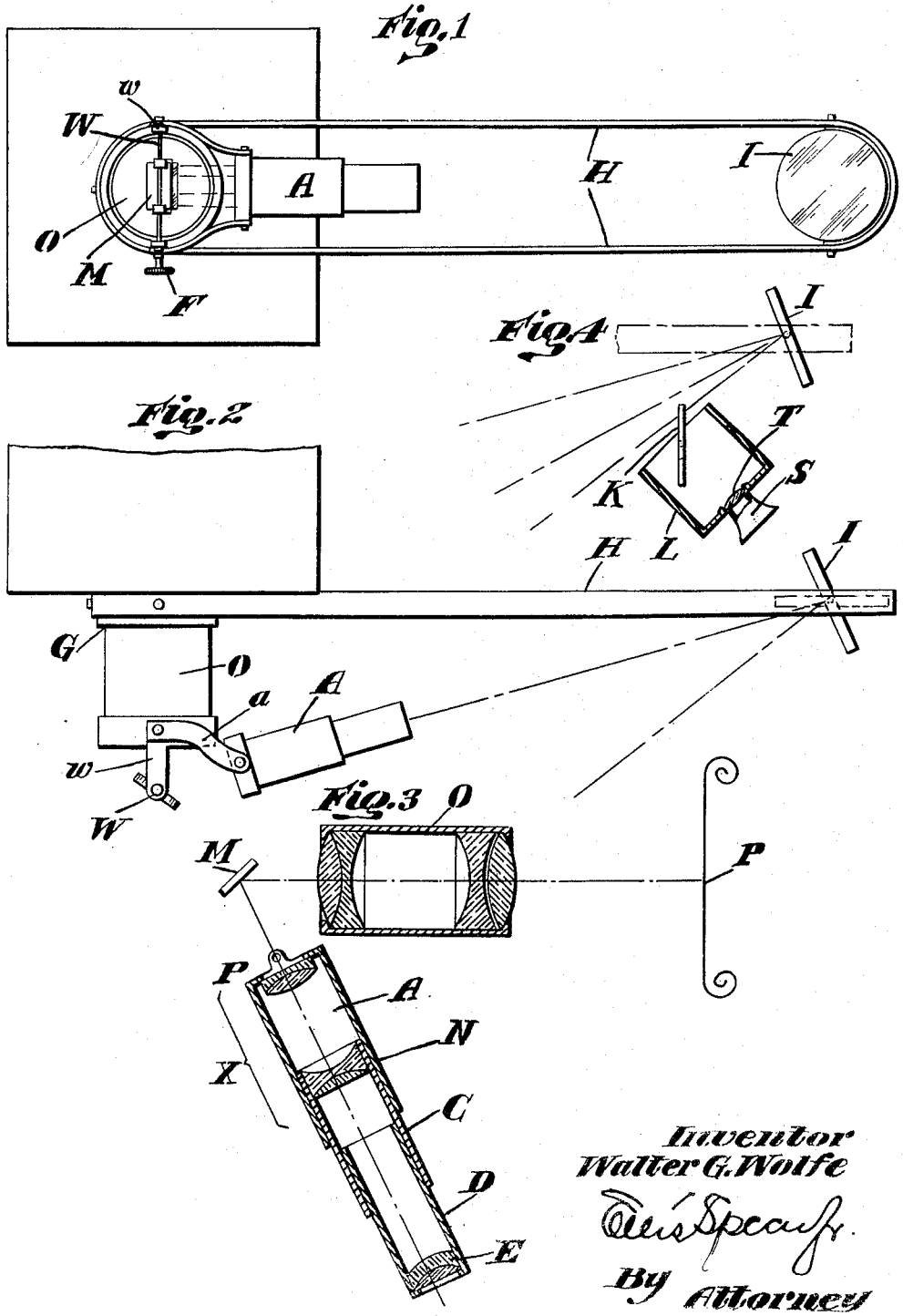

Patented Nov. 19, 1935

2,021,533

UNITED STATES PATENT OFFICE 2,021,533

TELLTALE SYSTEM FOR PROJECTION APPARATUS

Walter George Wolfe, Greenwood, Mass.

Application June 29, 1933, Serial No. 678,226

6 Claims. (Cl. 88—24)

In the projection of motion pictures or the like, the screen distance is usually so great as to make focusing difficult for the operator through mere inspection of the screen itself. The use of opera glasses is of little assistance on account of the high projection magnification of the film on the screen. Observational magnification, therefore, increases rather than relieves the effects of the projection magnification as observed by the eye. Re-focusing is necessarily quite frequent because of vibration, shocks and other causes and the distraction of the operator's attention from the booth, as in ordinary re-focusing, causes all sorts of difficulties.

My invention contemplates for such systems a continuous miniature of the screen picture. This is presented for convenient observation by the operator and is of such a size and corresponding focus as will enable the operator to maintain a maximum of definition and clarity in the screen picture.

The use of a miniature as a tell-tale involves the difficulties due to differences between the long distance focusing necessary for the stage screen and the short distance focusing necessary to give the corresponding effects on a short distance or miniature screen or surface in the operating booth. The problem of providing optics for establishing and maintaining a differential re-focusing of the abstracted miniature beam is complicated by reason of the relatively great differences in the distances involved. The back focus being determined by the projector system for the main beam, it will be seen that the problem is to attain a basis of re-focusing the minor beam without being able to make any relative change in back focus as the back focus is common to the two beams.

As part of my invention I have conceived of a combination system by which the desired results can be readily accomplished.

In order to make my concept clear and show satisfactory means for accomplishing the desired results, I have shown in the accompanying drawing as an indication of a simple basis of operating, a usual projector with a continuous miniature or focus tallying reproduction to be displayed in the booth or at any desired point or in any desired position. In the drawing:

Fig. 1 is a front elevation of a projector with a characteristic focusing tally system in accordance with my invention.

Fig. 2 is a plan view of the same.

Fig. 3 is a sectioned view of the projector system and its miniature auxiliary, and Fig. 4 a diagrammatic view of such a system with a close up observing device.

I have indicated at O a conventional projector of a moving picture machine or the like. Such a system is figured to give the desired magnification of the small moving picture film to full screen capacity at usually 100 to 150 feet and is focused in any usual way as by manipulating a knurled knob F.

In the axis of such a system and on the screen side thereof so as to be in the projected beam inside the conjugate of the projector focus, I support a mirror M. This is preferably pivotally hung on a fine diametrically disposed support W from brackets w.

Pivoted in brackets a carried by the projector mount or barrel O is an auxiliary mount A. Within the tubular shell of this is mounted a pair of telescopic tubular members C and D. In the mount A is the positive P of a neutralizing lens pair of which the negative N is carried in the tube slide C. An auxiliary lens E for extra magnification may be added when desired as by a tube D.

These two members A and C with their lenses P and N taken together may be considered as constituting a modifying element X. The usual lens system O provides for the normal magnification of the image of the film. The zero lens pair P and N provide for magnification of the reflected miniature image taken from the main beam as desired for short distance or local observation as in the booth.

The difficulty is to provide for the focusing of the auxiliary tell-tale system without disturbance of the focusing of the main projection system. It is important that the tell-tale miniature image correspond in its focus as to definition and other respects with the screen image. It must be borne in mind that the tell-tale miniature must be re-focused to accommodate the available or desired distance of the surface of intercept on which it is to be thrown after being diverted from the main beam. Ordinarily, this would involve a back focus change due to the independent focusing of the minor beam. Such a change in back focus of the minor beam cannot be had because its image, being reflected is dependent on the back focus of the main beam. The re-focusing of the minor or tell-tale image must, therefore, be accomplished without substantial interference with the back focus of the re-focusing system employed. To accomplish this I make the positive P and negative N of substantially neutralizing effect, although in practice I make the positive element somewhat weaker. For example, in the instance shown, I may make the lens P +3.12 dioptric and N —3.25 dioptric.

By spacing the lenses N and P through their slidable mounts A and C I in effect shorten in the auxiliary or miniature beam the focal length of its original source in the system O.

Assuming that the lenses N and P are equal and neutralizing, the spacing of these lenses introduces into the system an air gap which has the effect of a positive due to the neutralizing of N and P. This is effective without regard to back focus. If, as suggested above, a slight preponderance is given to the positive P the magnification is increased slightly. Within reasonable limits such added power can be provided still with practical disregard to back focus.

The magnification of such a zero system can be varied by changing the curvature of the positive and negative surfaces of the lens pair. For example, if somewhat more magnification be desirable over that indicated above, the system might be based on a +4.25 D instead of a +3.12. This would require less spacing of the positive and negative surfaces to get the same power in the air gap. For greater magnification the dioptric might be increased to say 5.25 and less separation needed to get the desired result as to the relation of the distance of the main screen and that of the miniature.

By adjusting the spacing of the lenses N and P the miniature beam may be sharply re-focused at any spot desired adjacent the projector. This may be simply a proper surface on the wall or ceiling of the booth or it may be a screen or target. Where the booth is illuminated such a surface member may conveniently be a translucent screen so that the operator may observe the telltale miniature without having to darken the booth.

It is usually necessary to change the direction of the miniature beam one or more times in order to throw it on the desired spot or tell-tale screen. For such purpose I provide a sleeve G adapted to be mounted on the projector tube O. This carries arms H between which is pivoted a mirror I. By adjusting the angles of the mount A by swinging about the axis of the main beam and by angularly adjusting the system X by swinging the receiver A a satisfactory position for the miniature can be reached. If the position desired makes it necessary more reflecting surfaces can be introduced to redirect the beam to the desired spot.

If it be desired to view a miniature image closely adjacent the projector, the beam from the mirror I may be picked up on a reflector K in a casing L having an eye piece S with a magnifying lens T if desired. The reflector K should be off tilted to the principal beam from the mirror I so as not to get the glare. The reflector K should also be of dull surface. For this purpose a mirror may be used for K which has been tarnished by the fumes of lead sulphide. Once so tarnished such a reflector maintains a dulled condition so that it can be observed in magnification as by the lens T.

What I therefore claim and desire to secure by Letters Patent is:—

1. In a projection apparatus, a projector including a projection lens system for the screen image of the main beam, a focusing mounting for the major projection objective, a mirror device for deflecting a minor portion from the main beam from a position beyond the projection lens system, an auxiliary focusing lens system for the deflected minor beam, and means carried by the major projection mounting for supporting the mirror and auxiliary lens system whereby the minor beam may be focused independently of the back focus of the projecting lens system upon an image receiving surface intercepting the minor beam and a true reproduction of the screen image is maintained regardless of changes in the focusing of the projector system.

2. In a projection apparatus, a projector including a projection lens system for the screen image of the main beam, a focusing mounting for the major projection objective, a mirror device for deflecting a minor portion from the main beam from a position beyond the projection lens system, an auxiliary focusing lens system for the deflected minor beam, and means carried by the major projection mounting for adjustably supporting the mirror and auxiliary lens system relative to the said point of deflection in the major beam axis beyond the major objective, whereby the minor beam may be focused independently of the back focus of the projecting lens system upon an image receiving surface intercepting the minor beam and a true reproduction of the screen image is maintained regardless of changes in the focusing of the projector system.

3. In a projection apparatus, a projector including a projection lens system for the screen image of the main beam, a focusing mounting for the major projection objective, a mirror device for deflecting a minor portion from the main beam from a position beyond the projection lens system, an auxiliary focusing lens system for the deflected minor beam, and movable means controlled by the focusing movement of the major projection mounting for supporting the mirror and auxiliary lens system whereby the minor beam may be focused independently of the back focus of the projecting lens system upon an image receiving surface intercepting the minor beam and a true reproduction of the screen image is maintained regardless of changes in the focusing of the projector system.

4. In a projection apparatus, a projector including a projection lens system for the screen image of the main beam, a focusing mounting for the major projection objective, a mirror device for deflecting a minor portion from the main beam from a position beyond the projection lens system, an auxiliary focusing lens system for the deflected minor beam including a substantially neutralizing spaced positive and negative lens pair of slightly different focal lengths, and movable means controlled by the focusing movement of the major projection mounting for supporting the mirror and auxiliary lens system whereby the minor beam may be focused independently of the back focus of the projecting lens system upon an image receiving surface intercepting the minor beam and a true reproduction of the screen image is maintained regardless of changes in the focusing of the projector system.

5. In a projection apparatus, a projector including a projection lens system for the screen image of the main beam, a focusing mounting for the major projection objective, a mirror device for deflecting a minor portion from the main beam from a position beyond the projection lens system, an auxiliary focusing lens system for the deflected minor beam including a substantially neutralizing spaced positive and negative lens pair but the positive being slightly weaker than the negative, and movable means controlled by the focusing movement of the major projection mounting for supporting the mirror and auxiliary lens system whereby the minor beam may be focused independently of the back focus of the projecting lens system upon an image receiving surface intercepting the minor beam whereby a true reproduction of the screen image is maintained regardless of changes in the focusing of the projector system.

6. In a projection apparatus, a projector including a projection lens system for the screen image of the main beam, a focusing mounting for the major projection objective, a mirror device for deflecting a minor portion from the main beam from a position beyond the projection lens system, an auxiliary focusing lens system for the deflected minor beam including a substantially neutralizing spaced positive and negative lens pair of slightly different focal lengths, means for pivotally supporting the mirror on the major projection mounting, and an adjustable mounting for the auxiliary lens system and pivotally connected to the projection mounting whereby the minor beam may be focused independently of the back focus of the projecting lens upon an image receiving surface for intercepting the minor beam and a true reproduction of the screen image is maintained regardless of changes in the focusing of the projector system.

WALTER GEORGE WOLFE.